United States Patent
Jiang et al.

(10) Patent No.: US 12,393,295 B2
(45) Date of Patent: Aug. 19, 2025

(54) METHOD, CIRCUIT, DEVICE FOR DRIVING DISPLAY TOUCH PANEL, AND DISPLAY TOUCH DEVICE

(71) Applicants: Hefei BOE Optoelectronics Technology Co., Ltd., Anhui (CN); BOE Technology Group Co., Ltd., Beijing (CN); Beijing BOE Technology Development Co., Ltd., Beijing (CN)

(72) Inventors: Zhaobo Jiang, Beijing (CN); Zhiwei Zhang, Beijing (CN); Beibei Shao, Beijing (CN); Jianqiu Zeng, Beijing (CN); Aobo Zhou, Beijing (CN); Lingzhi Zhou, Beijing (CN); Taorong Wang, Beijing (CN); Wei Li, Beijing (CN)

(73) Assignees: Hefei BOE Optoelectronics Technology Co., Ltd., Anhui (CN); BOE Technology Group Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/614,637

(22) Filed: Mar. 23, 2024

(65) Prior Publication Data
US 2025/0053254 A1    Feb. 13, 2025

Related U.S. Application Data

(63) Continuation of application No. PCT/CN2023/112327, filed on Aug. 10, 2023.

(51) Int. Cl.
G06F 3/041    (2006.01)
G06F 3/044    (2006.01)
G09G 5/00    (2006.01)

(52) U.S. Cl.
CPC .......... *G06F 3/0412* (2013.01); *G06F 3/0416* (2013.01); *G06F 3/044* (2013.01);
(Continued)

(58) Field of Classification Search
CPC ................. G06F 3/0412; G06F 3/0416; G06F 3/04166–04186; G06F 3/044–0448;
(Continued)

(56) References Cited

U.S. PATENT DOCUMENTS 9,619,067 B2 * 4/2017 Okamura .............. G06F 3/0416
10,585,536 B2 * 3/2020 O'Connor ............ G06F 1/3262
(Continued)

FOREIGN PATENT DOCUMENTS

CN    102779007 A    11/2012
CN    104731493 A     6/2015
(Continued)

*Primary Examiner* — Patrick F Marinelli
(74) *Attorney, Agent, or Firm* — Ling Wu; Stephen Yang; Ling and Yang Intellectual Property (57) ABSTRACT

The present application discloses a method, circuit, and device for driving a display touch panel, and a display touch device. A power supply conversion module, a power supply management module, a display touch drive module, and a control module are disposed in a circuit for driving a display touch panel, the control module sends an enabling signal to the power supply conversion module, the power supply conversion module switches an input power supply of the power supply management module to a touch power supply or a display power supply according to the enabling signal. Through the above technical solution, after a host sleeps, the display touch drive module still remains on-line, which may drive the display touch panel to scan, so as to identify whether the display touch panel is touched or not and further achieve a Wake On Touch (WOT) function.

20 Claims, 6 Drawing Sheets

(52) U.S. Cl.
CPC ....... *G09G 5/003* (2013.01); *G09G 2330/021* (2013.01); *G09G 2340/0435* (2013.01); *G09G 2354/00* (2013.01)

(58) Field of Classification Search
CPC .......... G09G 3/2092–2096; G09G 5/003–006; G09G 2330/021; G09G 2354/00; G09G 2340/0435
See application file for complete search history.

(56) References Cited

U.S. PATENT DOCUMENTS

| | | | | |
|---|---|---|---|---|
| 11,543,873 | B2* | 1/2023 | Sengupta | G06F 1/3215 |
| 11,592,934 | B2* | 2/2023 | Yoon | G06F 3/0383 |
| 11,810,497 | B2* | 11/2023 | Yoon | G06F 3/04166 |
| 11,900,858 | B2* | 2/2024 | Choi | G06F 3/04166 |
| 12,086,357 | B2* | 9/2024 | Yoon | G06F 3/04166 |
| 2015/0268778 | A1* | 9/2015 | Okamura | G06F 3/0446 345/173 |
| 2020/0026342 | A1* | 1/2020 | Sengupta | G06F 3/0416 |
| 2021/0004103 | A1* | 1/2021 | Jang | G06F 3/04184 |
| 2021/0149474 | A1* | 5/2021 | Choi | G06F 3/0412 |
| 2023/0008655 | A1* | 1/2023 | Yoon | G06F 1/324 |
| 2023/0080254 | A1* | 3/2023 | Yoon | G06F 1/169 713/323 |
| 2023/0083400 | A1* | 3/2023 | Huang | G06F 1/3265 345/173 |
| 2023/0215340 | A1* | 7/2023 | Choi | G06F 3/0412 345/174 |
| 2024/0004496 | A1* | 1/2024 | Yoon | G06F 3/0412 |
| 2024/0211078 | A1* | 6/2024 | Kim | G06F 3/04184 |

FOREIGN PATENT DOCUMENTS

| | | |
|---|---|---|
| CN | 106200853 A | 12/2016 |
| CN | 109166546 A | 1/2019 |
| CN | 109683735 A | 4/2019 |
| CN | 112445368 A | 3/2021 |
| CN | 114327113 A | 4/2022 |
| CN | 116232006 A | 6/2023 |
| JP | 2012203131 A | 10/2012 |
| JP | 2012221435 A | 11/2012 |

* cited by examiner

Send an enabling signal to a power supply conversion module, so that the power supply conversion module switches an input power supply of a power supply management module to a display power supply or a touch power supply according to the enabling signal ⟵ 801

METHOD, CIRCUIT, DEVICE FOR DRIVING DISPLAY TOUCH PANEL, AND DISPLAY TOUCH DEVICE

CROSS-REFERENCE TO RELATED APPLICATION

This application is a continuation of International PCT Application No. PCT/CN2023/112327 filed on Aug. 10, 2023, which is incorporated herein by reference in its entirety.

TECHNICAL FIELD

The present application belongs to the field of display technologies, in particular to a method, a circuit, and a device for driving a display touch panel, and a display touch device.

BACKGROUND

With release of a win11 operating system, a Wake On Touch (WOT) function is first applied to an electronic product (such as a notebook computer) installed with the win11 operating system, which requires that a Touch module of a display touch panel in the electronic product may achieve the WOT function.

According to a relative position relationship between a touch module and a display panel (also called Display), display touch panels may be divided into an In-cell type, an On-cell type, and an add-on type, wherein a display touch panel of an In-cell type is also called an in-cell capacitive touch control panel. At present, in a mainstream motherboard design, a touch power supply of the display touch panel and a display power supply are independent. In display touch panels of an On-cell type and an add-on type, since a touch module and a display panel are independent, after a host goes to sleep, the display power supply is turned off and the touch power supply is kept, and the touch module may achieve the WOT function. In a display touch panel of an In-cell type, an Analog Front End (AFE) of a touch module, a drive module such as scanning, and a source drive module of a display panel are all integrated in a touch control and source drive chip (Source Readout Integrated Circuit (SRIC)). When a host goes to sleep, a display power supply is turned off, and then the SRIC will be powered off. At this time, the host cannot be awakened by touch. Therefore, the display touch panel of the In-cell type cannot cooperate with the win11 operating system to achieve the WOT function.

SUMMARY

Embodiments of the present application provide a method, a circuit, and a device for driving a display touch panel, and a display touch device, which solve a problem that a display touch panel of an In-cell type cannot cooperate with a win11 operating system to achieve a WOT function.

Other features and advantages of the present application will become apparent from following detailed description or will be acquired in part through practice of the present application.

According to a first aspect of an embodiment of the present application, a circuit for driving a display touch panel is provided. The drive circuit includes: a power supply conversion module, a power supply management module, a display touch drive module, and a control module; a power supply input end of the power supply conversion module is configured to be connected with a display power supply and a touch power supply, an enabling end of the power supply conversion module is connected with an enabling end of the control module, and an output end of the power supply conversion module is connected with a power supply input end of the display touch drive module via the power supply management module; an output end of the display touch drive module is configured to be connected with the display touch panel, and the display touch panel is an in-cell capacitive touch control panel; and the touch power supply and the display power supply are respectively connected with a power supply input end of the control module; wherein the control module is configured to send an enabling signal to the power supply conversion module; the power supply conversion module is configured to switch an input power supply of the power supply management module to the touch power supply or the display power supply according to the enabling signal; the power supply management module is configured to supply power to the display touch drive module by using the touch power supply or the display power supply, to enable the display touch drive module to drive the display touch panel to work.

In some embodiments of the present application, based on the aforementioned solution, the enabling signal includes a first enabling signal and a second enabling signal, and the control module is further configured to send the first enabling signal to the power supply conversion module when a host is in a sleep state, or send the second enabling signal to the power supply conversion module when it is detected that the display touch panel is touched; and the power supply conversion module is further configured to switch the input power supply of the power supply management module from the display power supply to the touch power supply according to the first enabling signal, or switch the input power supply of the power supply management module from the touch power supply to the display power supply according to the second enabling signal.

In some embodiments of the present application, based on the aforementioned solution, a control end of the control module is connected with a controlled end of the display touch drive module, and the control module is further configured to send a display closing instruction to the display touch drive module, to enable the display touch drive module to control a display function of the display touch panel to close according to the display closing instruction.

In some embodiments of the present application, based on the aforementioned solution, the display touch drive module includes a touch control and source drive chip, wherein the touch control and source drive chip is respectively connected with the control end of the control module, the power supply management module, and the display touch panel.

In some embodiments of the present application, based on the aforementioned solution, the display touch drive module further includes a timing control unit, wherein the timing control unit is respectively connected with the control end of the control module, the power supply management module, and the display touch panel.

In some embodiments of the present application, based on the aforementioned solution, the control module includes a micro-control unit and a first step-down unit, wherein a first power supply input end of the micro-control unit is connected with the touch power supply via the first step-down unit, a second power supply input end of the micro-control unit is connected with the touch power supply, and a control end of the micro-control unit is respectively connected with the touch control and source drive chip and the timing control unit.

In some embodiments of the present application, based on the aforementioned solution, the display touch drive module further includes a timing control unit and a second step-down unit, wherein the timing control unit is connected with the display power supply via the second step-down unit, and the timing control unit is further connected with the display touch panel.

In some embodiments of the present application, based on the aforementioned solution, the control module includes a micro-control unit and a first step-down unit, wherein a first power supply input end of the micro-control unit is connected with the touch power supply via the first step-down unit, a second power supply input end of the micro-control unit is connected with the touch power supply, and a control end of the micro-control unit is connected with the touch control and source drive chip.

According to a second aspect of the embodiment of the present application, a method for driving a display touch panel is provided, which is applied to the above circuit for driving the display touch panel, wherein the drive method includes: sending an enabling signal to a power supply conversion module, to enable the power supply conversion module to switch an input power supply of the power supply management module to a display power supply or a touch power supply according to the enabling signal.

In some embodiments of the present application, based on the aforementioned solution, the enabling signal includes a first enabling signal and a second enabling signal, and the sending the enabling signal to the power supply conversion module, to enable the power supply conversion module to switch the input power supply of the power supply management module to the display power supply or the touch power supply according to the enabling signal, includes: sending the first enabling signal to the power supply conversion module, to enable the power supply conversion module to switch the input power supply of the power supply management module from the display power supply to the touch power supply according to the first enabling signal, or sending the second enabling signal to the power supply conversion module, to enable the power supply conversion module to switch the input power supply of the power supply management module from the touch power supply to the display power supply according to the second enabling signal.

In some embodiments of the present application, based on the aforementioned solution, after sending the first enabling signal to the power supply conversion module, the method further includes: sending a display closing instruction to a touch control and source drive chip and a timing control unit, to enable the touch control and source drive chip and the timing control unit to control a display function of the display touch panel to close according to the display closing instruction.

In some embodiments of the present application, based on the aforementioned solution, after sending the display closing instruction to the touch control and source drive chip and the timing control unit, the method further includes: sending a first scanning frequency to the touch control and source drive chip, to enable the touch control and source drive chip to reduce a scanning frequency of the display touch panel according to the first scanning frequency.

According to a third aspect of the embodiment of the present application, an apparatus for driving a display touch panel is provided, which is applied to the above circuit for driving the display touch panel, wherein the drive apparatus includes: a control unit, configured to send an enabling signal to a power supply conversion module, to enable the power supply conversion module to switch an input power supply of the power supply management module to a display power supply or a touch power supply according to the enabling signal.

According to a fourth aspect of the embodiment of the present application, a device for driving a display touch panel is provided, including a processor and a memory, wherein the memory stores computer program instructions capable of being executed by the processor, and instructions of the above method for driving the display touch panel are implemented when the processor executes the computer program instructions.

According to a fifth aspect of the embodiment of the present application, a display touch device is provided, including a display touch panel and the above device for driving the display touch panel, wherein the display touch panel is an in-cell capacitive touch control panel.

In the present application, a power supply conversion module, a power supply management module, a display touch drive module, and a control module are disposed in a circuit for driving a display touch panel, the control module sends an enabling signal to the power supply conversion module, the power supply conversion module switches an input power supply of the power supply management module to a touch power supply or a display power supply according to the enabling signal, so that the power supply management module supplies power to the display touch drive module by using the touch power supply or the display power supply, and further the display touch drive module may drive a display touch panel of an In-cell type to work. According to the above technical solution, after a host sleeps, the display touch drive module still remains on-line, which may drive the display touch panel to scan, so as to identify whether the display touch panel is touched or not, and further achieve the WOT function.

It should be understood that the above general description and following detailed description are exemplary and explanatory only, and are not intended to limit the present application.

BRIEF DESCRIPTION OF THE DRAWINGS

The accompanying drawings here are incorporated in the specification and constitute a part of the specification, illustrate the embodiments conforming to the present application, and together with the specification, are used for explaining the principle of the present application. Apparently, the drawings in following description are only some embodiments of the present application. For a person of ordinary skill in the art, other drawings may be obtained according to these drawings without paying any inventive effort.

Description of reference labels is as follows.

| Label | Name | Label | Name |
|-------|------|-------|------|
| 10 | power supply conversion module | 32 | timing control unit |
| 20 | power supply management module | 33 | second step-down unit |
| 30 | display touch drive module | 41 | micro-control unit |
| 40 | control module | 42 | first step-down unit |
| 50 | display touch panel | Vcc | display power supply |
| 31 | touch control and source drive chip | VTSP | touch power supply |

DETAILED DESCRIPTION

Technical solutions in the embodiments of the present application will be described clearly and completely below with reference to the drawings in the embodiments of the present application. Apparently, described embodiments are only a part of the embodiments of the present application, rather than all of the embodiments. Based on the embodiments of the present application, all other embodiments obtained by a person of ordinary skill in the art without paying any inventive effort belong to the scope of protection of the present application.

Further, described features, structures, or characteristics may be incorporated in one or more embodiments in any suitable mode. In following description, many specific details are provided to give full understanding of the embodiments of the present application. However, those skilled in the art will appreciate that the technical solutions of the present application may be practiced without one or more of specific details, or other methods, components, apparatuses, acts, etc. may be used. In other cases, well-known methods, apparatuses, implementations, or operations are not shown or described in detail to avoid obscuring various aspects of the present application.

Block diagrams shown in the drawings are only functional entities and do not necessarily correspond to physically independent entities. That is, these functional entities may be implemented in software form, or in one or more hardware modules or integrated circuits, or in different networks and/or processor apparatuses and/or microcontroller apparatuses.

Flowcharts shown in the drawings are illustrative explanations only and do not necessarily include all contents and operations/acts, nor are they necessarily to be performed in orders described. For example, some operations/acts may also be decomposed, while other operations/acts may be merged or partially merged, so an order actually performed may change according to an actual situation.

It should also be noted that terms "first", "second", etc. in the specification and claims of the present application and the above drawings are used for distinguishing similar objects, and need not be used for describing a specific order or precedence. It should be understood that objects used in this way are interchangeable under appropriate situations, so that the embodiments of the present application described herein can be implemented in an order other than those illustrated or described.

Figure 1:
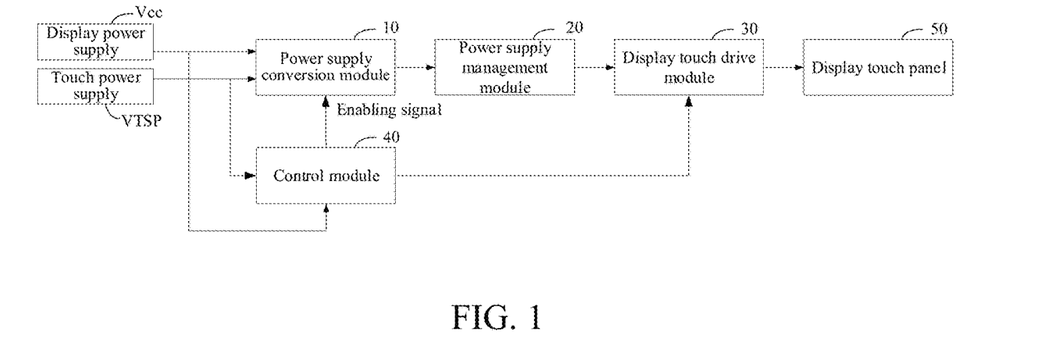
FIG. 1 shows a functional block diagram of a circuit for driving a display touch panel in an embodiment.

FIG. 1 shows a functional module diagram of a circuit for driving a display touch panel in an embodiment. As shown in FIG. 1, the circuit for driving the display touch panel may include: a power supply conversion module 10, a power supply management module 20, a display touch drive module 30, and a control module 40; a power supply input end of the power supply conversion module 10 is configured to be connected with a display power supply Vcc and a touch power supply VTSP, an enabling end of the power supply conversion module 10 is connected with an enabling end of the control module 40, and an output end of the power supply conversion module 10 is connected with a power supply input end of the display touch drive module 30 via the power supply management module 20; an output end of the display touch drive module 30 is configured to be connected with the display touch panel 50, wherein the display touch panel 50 is an in-cell capacitive touch control panel; the touch power supply VTSP and the display power supply Vcc are respectively connected with a power supply input end of the control module 40; among them, the control module 40 is configured to send an enabling signal to the power supply conversion module 10 when a host is in a sleep state; the power supply conversion module 10 is configured to switch an input power supply of the power supply management module 20 to the touch power supply VTSP or the display power supply Vcc according to an enabling signal; and the power supply management module 20 is configured to supply power to the display touch drive module 30 by using the touch power supply VTSP or the display power supply Vcc, so that the display touch drive module 30 drives the display touch panel 50 to work.

Understandably, in an electronic product installed with a win11 operating system, WOT is a newly supported function for users to choose from. When a user chooses to turn on the WOT function, the user may wake up the system by performing a touch operation for the display touch panel. At present, display touch panels of an On-cell type and an add-on type may achieve the WOT function, while a display touch panel of an In-cell type (i.e., an in-cell capacitive touch control panel) cannot achieve the WOT function. For the embodiment of the present application, by designing the circuit for driving the display touch panel, when the host is in the sleep state and the touch power supply VTSP is not powered off, power is supplied to the power supply management module 20 by selecting the touch power supply VTSP through the power supply conversion module 10, so that the display touch drive module 30 still remains on-line when the host sleeps, and may drive the display touch panel 50 to scan to identify whether a burst point (i.e., a finger region) on the display touch panel 50 is touched or not, thus achieving the WOT function.

Among them, a touch control electrode of the in-cell capacitive touch control panel is embedded in a liquid crystal cell, and a touch control operation may be recognized by means of capacitive sensing. In some embodiments, the touch control electrode of the in-cell capacitive touch control panel is multiplexed with a common electrode, and both the touch control electrode and a display signal line are connected to a Touch and Display Driver Integration (TDDI).

The power supply conversion module 10 may be achieved through combination of a P-channel Metal Oxide Semiconductor (PMOS) and an N-channel Metal Oxide Semiconductor (NMOS), and a combination form of the PMOS and the NMOS is not limited in the embodiment of the present application.

The power supply management module 20 may be a Power Management IC (PMIC), configured to supply power to the display touch drive module 30.

The display touch drive module 30 may include elements such as an SRIC, a Timing controller (Tcon) 32, a Touch Modulation IC (TMIC), and a level conversion chip, configured to drive the display touch panel 50 to achieve a display function and a touch wake-up function.

It should be noted that the power supply input end of the power supply conversion module 10 is configured to be connected with the display power supply Vcc and the touch power supply VTSP, which means that the power supply input end of the power supply conversion module 10 may be connected with the display power supply Vcc and the touch power supply VTSP, that is, the power supply input end of the power supply conversion module 10 may have been connected with the display power supply Vcc and the touch power supply VTSP, or may be connected with the display power supply Vcc and the touch power supply VTSP when drive of the display touch panel 50 needs to be completed.

The output end of the display touch drive module 30 is configured to be connected with the display touch panel 50, which means that the output end of the display touch drive module 30 may be connected with the display touch panel 50, that is, the output end of the display touch drive module 30 may have been connected with the display touch panel 50, or may be connected with the display touch panel 50 when drive of the display touch panel 50 needs to be completed.

In some embodiments, the enabling signal includes a first enabling signal and a second enabling signal, and the control module 40 is also configured to send the first enabling signal to the power supply conversion module 10 when the host is in the sleep state, or to send the second enabling signal to the power supply conversion module 10 when it is detected that the display touch panel 50 is touched; and the power supply conversion module 10 is also configured to switch the input power supply of the power supply management module 20 from the display power supply Vcc to the touch power supply VTSP according to the first enabling signal, or to switch the input power supply of the power supply management module from the touch power supply VTSP to the display power supply Vcc according to the second enabling signal.

In some embodiments, the control module 40 may also be configured to send the second enabling signal to the power supply conversion module 10 when the host is in a normal operation mode, so that the power supply conversion module 10 selects the display power supply Vcc as the input power supply of the power supply management module 20 according to the second enabling signal.

Assuming that the first enabling signal is a low-level signal and the second enabling signal is a high-level signal, the control module 40 may send the high-level signal to the power supply conversion module 10 when the host is in the normal operation mode, and the power supply conversion module 10 selects the display power supply Vcc as the input power supply of the power supply management module 20; after the host enters the sleep state, the control module 40 may send the low-level signal to the power supply conversion module 10, and the power supply conversion module 10 switches the input power supply of the power supply management module 20 from the display power supply Vcc to the touch power supply VTSP; when a burst point on the display touch panel 50 is touched, the control module 40 sends the high-level signal to the power supply conversion module 10, and the power supply conversion module 10 selects the display power supply Vcc as the input power supply of the power supply management module 20.

In some embodiments, a control end of the control module 40 is connected with a controlled end of the display touch drive module 30, and the control module 40 is also configured to send a display closing instruction to the display touch drive module 30, so that the display touch drive module 30 controls a display function of the display touch panel 50 to close according to the display closing instruction.

It may be understood that by connecting the control end of the control module 40 with the controlled end of the display touch drive module 30, the control module 40 may send a control instruction to the display touch drive module 30 to achieve controlling of the display touch panel 50 through the display touch drive module 30, wherein the control instruction includes, but is not limited to, the display closing instruction, a scanning frequency, and the like.

For the embodiment of the present application, by designing the circuit for driving the display touch panel, it is achieved that the display touch drive module still remains on-line after the host sleeps, and the display touch panel may be driven to scan to identify whether the display touch panel is touched or not, thereby achieving the WOT function.

Figure 2:
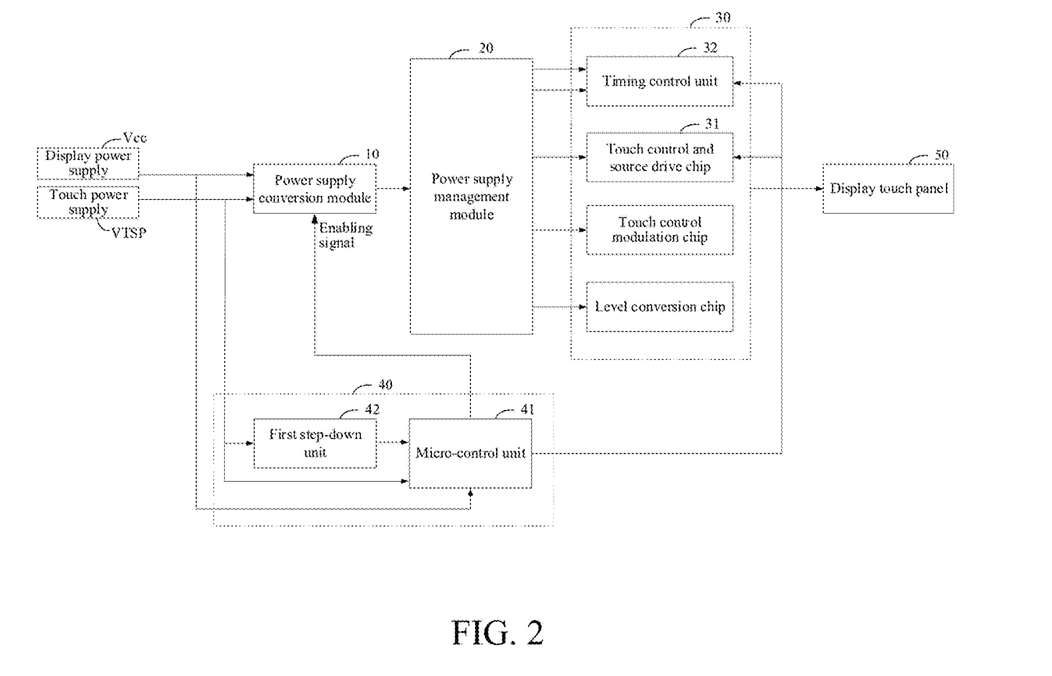
FIG. 2 shows a schematic diagram of a structure of a circuit for driving the display touch panel in FIG. 1.

FIG. 2 shows a schematic diagram of a structure of a circuit for driving the display touch panel 50 in FIG. 1. As shown in FIG. 2, the display touch drive module 30 may include a touch control and source drive chip 31, wherein the touch control and source drive chip 31 is respectively connected with the control end of the control module 40, the power supply management module 20, and the display touch panel 50.

It may be understood that the touch control and source drive chip 31 (i.e., SRIC) integrates drive of a touch function of the display touch panel 50 and partial drive of the display function. By being connected with the power supply management module 20, the power supply management module 20 supplies power to the SRIC, the SRIC may be ensured to work normally; by being connected with the control end of the control module 40, the SRIC may receive a control instruction sent by the control module 40; by being connected with the display touch panel 50, the SRIC may drive the display touch panel 50 to achieve the touch function and the display function according to the control instruction.

In some embodiments, the display touch drive module 30 may also include a timing control unit 32, wherein the timing control unit 32 is connected with the control end of the control module 40, the power supply management module 20, and the display touch panel 50, respectively.

It may be understood that the timing control unit 32 (i.e., Tcon) may be a timing controller, and by being connected with the power supply management module 20, the power supply management module 20 supplies power to the Tcon, the Tcon may be ensured to work normally; by being connected with the control end of the control module 40, the Tcon may receive a control instruction sent by the control module 40; by being connected with the display touch panel 50, the Tcon may close the partial drive of the display function of the display touch panel 50 according to the control instruction.

In some embodiments, the control module 40 may include a micro-control unit 41 and a first step-down unit 42, wherein a first power supply input end of the micro-control unit 41 is connected with the touch power supply VTSP via the first step-down unit 42, a second power supply input end of the micro-control unit 41 is connected with the touch power supply VTSP, and a control end of the micro-control unit 41 is connected with the touch control and source drive chip 31 and the timing control unit 32, respectively.

It may be understood that the first step-down unit 42 is configured to reduce a voltage provided by the touch power supply VTSP. In an implementation process, the first step-down unit 42 may reduce the voltage provided by the touch power supply VTSP to 1.8 V and then supply power to the micro-control unit 41.

In some embodiments, the display touch drive module 30 may also include a touch control modulation chip (not indicated) and a level conversion chip (not indicated), wherein the touch control modulation chip is connected with the power supply management module 20 and the display touch panel 50, respectively, and the level conversion chip is connected with the power supply management module 20 and the display touch panel 50, respectively.

Figure 3:
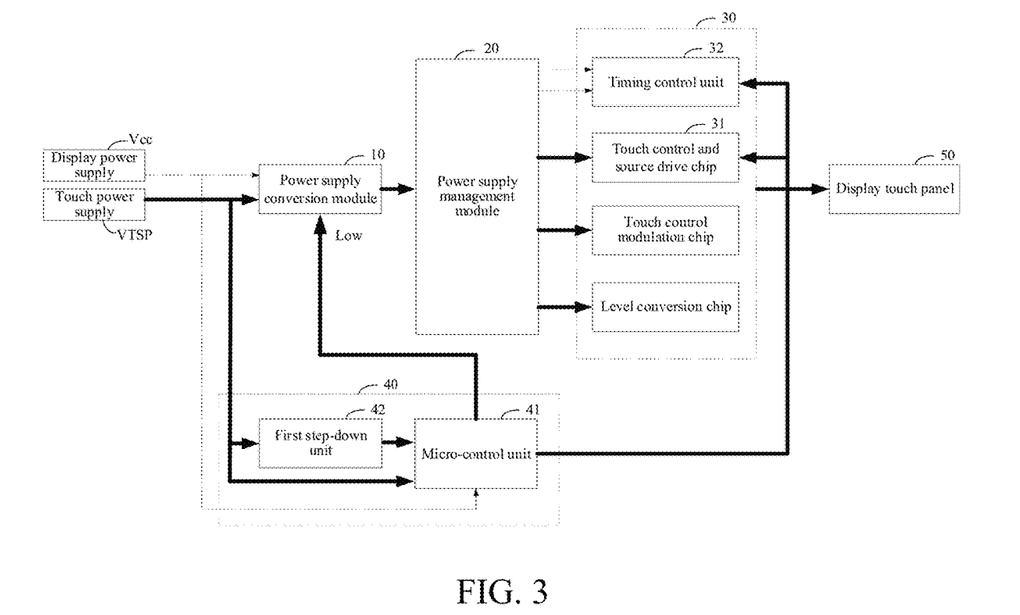
FIG. 3 shows a signal flow diagram of FIG. 2 when a host is in a sleep state.

FIG. 3 shows a signal flow diagram of FIG. 2 when a host is in a sleep state, and an achieving principle of the WOT function in the embodiment of the present application is explained below based on FIG. 3: after the host enters the sleep state, the micro-control unit 41 receives a "TP Sleep" instruction sent by the host and enters a WOT mode. The host will control the display power supply Vcc to be powered off, while the micro-control unit 41 generates a first enabling signal Low and sends it to the power supply conversion module 10, wherein the power supply conversion module 10 selects the touch power supply VTSP as the input power supply of the power supply management module 20. The micro-control unit 41 notifies the timing control unit 32 and the touch control and source drive chip 31 to close drive of the display function, the display function of the display touch panel 50 is closed, the host enters an idle mode (i.e., the display function is closed and the touch function is idle), and a scanning frequency of the display touch panel 50 may be reduced from 120 Hz to 30 Hz.

In an idle mode, if the micro-control unit 41 detects that a burst point of the display touch panel 50 is touched, the touch function of the display touch panel 50 will be fully awakened. At this time, the touch function is activated, the scanning frequency of the display touch panel 50 may be switched back to 120 Hz for scanning, and the micro-control unit 41 sends a finger information packet (also called a finger packet) to the host to awaken the host. The host controls the display power supply Vcc to be re-powered, and a wake-up instruction is sent to the micro-control unit 41. After receiving the wake-up instruction, the micro-control unit 41 generates a second enabling signal High and sends it to the power supply conversion module 10. The power supply conversion module 10 selects the display power supply Vcc as the input power supply of the power supply management module 20. The micro-control unit 41 awakens the timing control unit 32 and related drive of the display function in the touch control and source drive chip 31, and the host enters a normal operation mode. In the normal operation mode, the display function of the display touch panel 50 is opened, and the touch function is activated, thus achieving the WOT function.

For the embodiment of The present application, through a related circuit design of the touch control and source drive chip and the timing control unit, controlling of the touch control and source drive chip and the timing control unit in the display touch drive module by the micro-control unit is achieved, which reduces power consumption and a cost when achieving the WOT function.

Figure 4:
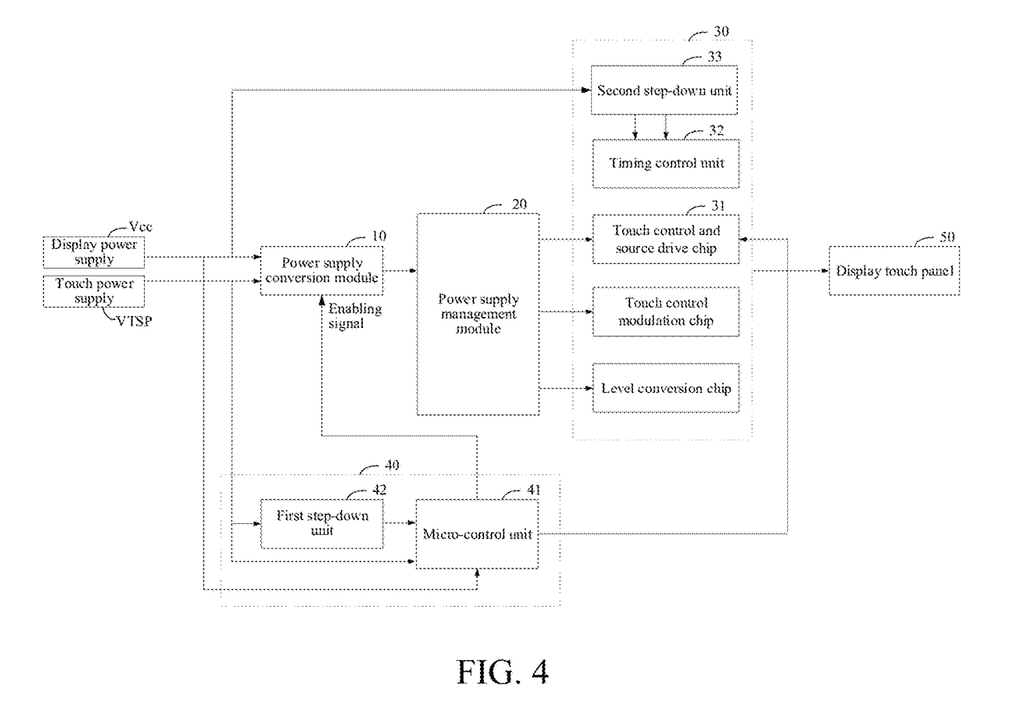
FIG. 4 shows a schematic diagram of another structure of the circuit for driving the display touch panel in FIG. 1.

FIG. 4 shows a schematic diagram of a structure of the circuit for driving the display touch panel 50 in FIG. 1. As shown in FIG. 4, the display touch drive module 30 may include a touch control and source drive chip 31, wherein the touch control and source drive chip 31 is connected with a control end of a control module 40, a power supply management module 20, and a display touch panel 50, respectively.

In some embodiments, the display touch drive module 30 may also include a timing control unit 32 and a second step-down unit 33, wherein the timing control unit 32 is connected with a display power supply Vcc via the second step-down unit 33, and the timing control unit 32 is also connected with the display touch panel 50.

It may be understood that the second step-down unit 33 is configured to reduce a voltage provided by the display power supply Vcc, and in an implementation process, the second step-down unit 33 may reduce a voltage provided by a touch power supply VTSP to 1.8 V and 0.9 V, respectively, and then supply power to the timing control unit 32.

In some embodiments, the control module 40 includes a micro-control unit 41 and a first step-down unit 42, wherein a first power supply input end of the micro-control unit 41 is connected with the touch power supply VTSP via the first step-down unit 42, a second power supply input end of the micro-control unit 41 is connected with the touch power supply VTSP, and a control end of the micro-control unit 41 is connected with the touch control and source drive chip 31.

It may be understood that, different from FIG. 2, the timing control unit 32 in FIG. 2 is powered by the power supply management module 20, while the timing control unit 32 in FIG. 4 is powered by the second step-down unit 33. After the display power supply Vcc is turned off, the second step-down unit 33 will be powered off, and then the timing control unit 32 is turned off. At this time, the micro-control unit 41 does not need to control the timing control unit 32 to be turned off, and thus the micro-control unit 41 does not need to be connected with the timing control unit 32. At a high resolution and a high refresh rate, the timing control unit 32 may be powered through an external second step-down unit 33.

Figure 5:
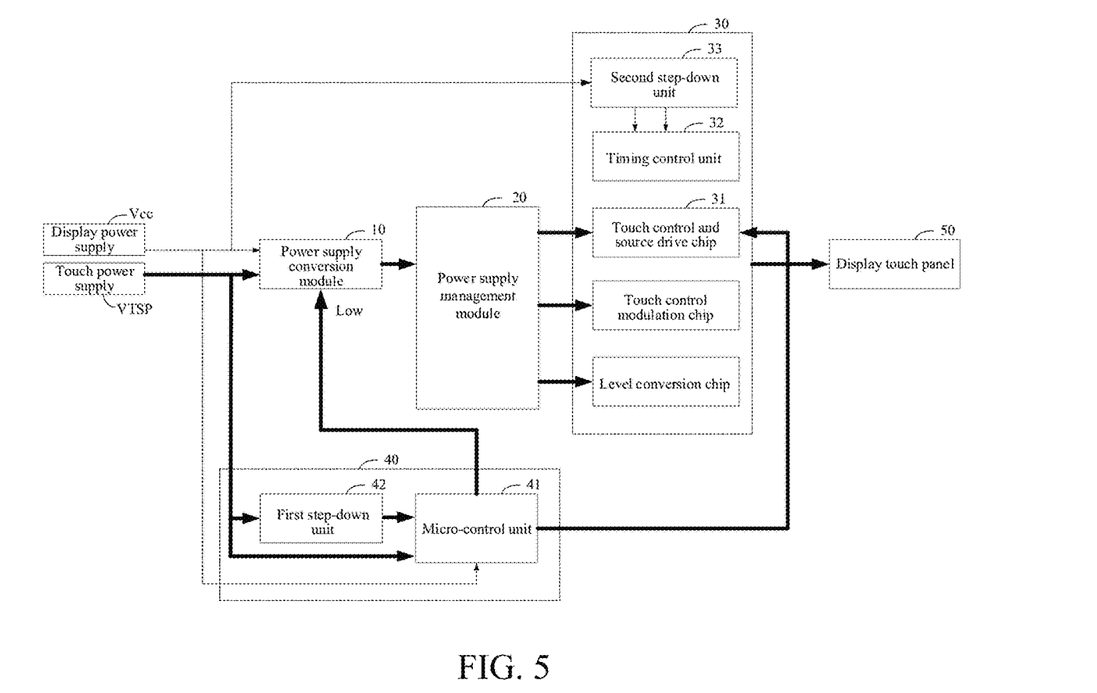
FIG. 5 shows a signal flow diagram of FIG. 4 when a host is in a sleep state.

FIG. 5 shows a signal flow diagram of FIG. 4 when a host is in a sleep state. As shown in FIG. 5, when the host is in the sleep state, the display power supply Vcc is turned off, the second step-down unit 33 is powered off, and then the timing control unit 32 is turned off. The power supply management module 20 only supplies power to the touch control and source drive chip 31, a touch control modulation chip, and a level conversion chip. A principle of achieving the WOT function by the circuit for driving the display touch panel shown in FIGS. 4 and 5 may be referred to the previous embodiment, and will not be repeated here.

Figure 6:
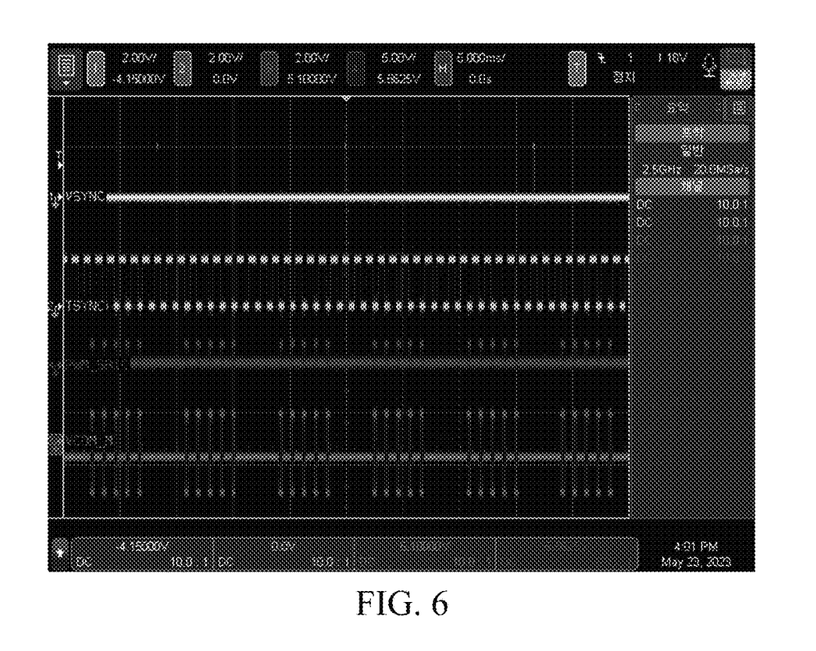
FIG. 6 shows a scanning actual measurement diagram of a touch function of the display touch panel in FIG. 1 in an activated state.

FIG. 6 shows a scanning actual measurement diagram of a touch function of the display touch panel in FIG. 1 in an activated state. As shown in FIG. 6, in the activated state, if a scanning frequency is 120 Hz, eight touch slots (also called Touch slots) may be scanned within one frame of the display touch panel.

Figure 7:
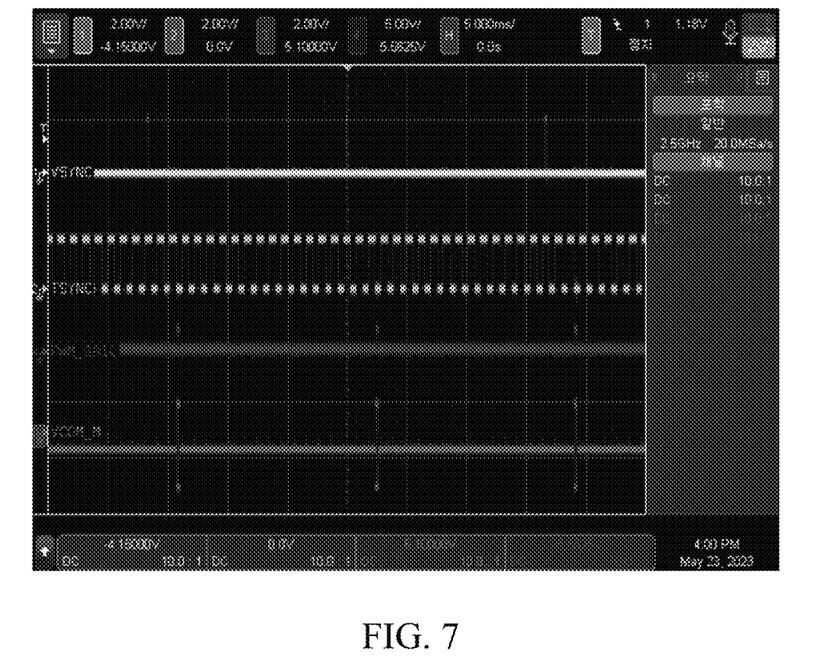
FIG. 7 shows a scanning actual measurement diagram of a touch function of the display touch panel in FIG. 1 in an idle state.

FIG. 7 shows a scanning actual measurement diagram of a touch function of the display touch panel in FIG. 1 in an idle state. As shown in FIG. 7, in the idle state, if a scanning frequency is 30 Hz, two touch slots may be scanned within two frames of the display touch panel.

For the embodiment of the present application, by designing independent power supplying for the timing control unit, a control logic of the micro-control unit is simplified, improving a response speed and an efficiency of the WOT function.

Figure 8:
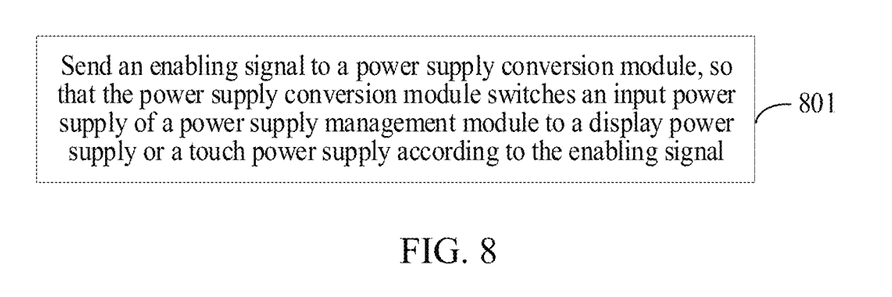
FIG. 8 shows a flow schematic diagram of a method for driving a display touch panel in an embodiment.

FIG. 8 shows a flow schematic diagram of a method for driving a display touch panel in an embodiment, and following takes the method for driving the display touch panel applied to the micro-control unit in the circuit for driving the display touch panel as an example for illustration. As shown in FIG. 8, the method for driving the display touch panel may include an act 801: an enabling signal is sent to the power supply conversion module, so that the power supply conversion module switches the input power supply of the power supply management module to the display power supply or the touch power supply according to the enabling signal.

It may be understood that, the enabling signal may include a first enabling signal and a second enabling signal, wherein the second enabling signal is different from the first enabling signal, and when the second enabling signal is a high-level signal High, the first enabling signal is a low-level signal Low.

In some embodiments, the micro-control unit may send the first enabling signal to the power supply conversion module when the host is in the sleep state, or send the second enabling signal to the power supply conversion module when the display touch panel is touched, or send the second enabling signal to the power supply conversion module when the host is in the normal operation mode.

In an implementation process, after the host enters the sleep state, the micro-control unit receives a "TP Sleep" instruction sent by the host and enters a WOT mode. The host will control the display power supply to be powered off, and meanwhile the micro-control unit generates the first enabling signal. After receiving the first enabling signal, the power supply conversion module selects the touch power supply as the input power supply of the power supply management module.

In an implementation process, the micro-control unit may determine whether the display touch panel is touched or not according to whether a sensed quantity of burst points of the display touch panel is greater than a preset value, and generate the second enabling signal when the display touch panel is touched. After receiving the second enabling signal, the power supply conversion module selects the display power supply as the input power supply of the power supply management module.

In an implementation process, when the host is in the normal operation mode, the micro-control unit still sends the second enabling signal to the power supply conversion module, and after receiving the second enabling signal, the power supply conversion module still selects the display power supply as the input power supply of the power supply management module.

In some embodiments, after sending the first enabling signal to the power supply conversion module, the method for driving the display touch panel may also include a following act: a display closing instruction is sent to the touch control and source drive chip and the timing control unit, so that the touch control and source drive chip and the timing control unit control the display function of the display touch panel to close according to the display closing instruction.

It may be understood that, after the timing control unit and the touch control and source drive chip receive the display closing instruction, the display function of the display touch panel is controlled to close, which may reduce power consumption in the WOT mode.

In some embodiments, after sending a display closing instruction to the touch control and source drive chip and the timing control unit, the method for driving the display touch panel may also include a following act: a first scanning frequency is sent to the touch control and source drive chip, so that the touch control and source drive chip reduces a scanning frequency of the display touch panel according to the first scanning frequency.

It may be understood that, when the host is in the normal operation mode, the scanning frequency of the display touch panel is relatively high, and when the host enters the sleep state, the scanning frequency of the display touch panel is reduced, which may also achieve a purpose of saving power consumption.

For the embodiment of the present application, through a design of the method for driving the display touch panel, it is achieved that after the host sleeps, the touch power supply is used for supplying power to the power supply management module, so that the display touch drive module may also remain on-line, and the display touch panel is driven to scan, thereby achieving the WOT function.

Figure 9:
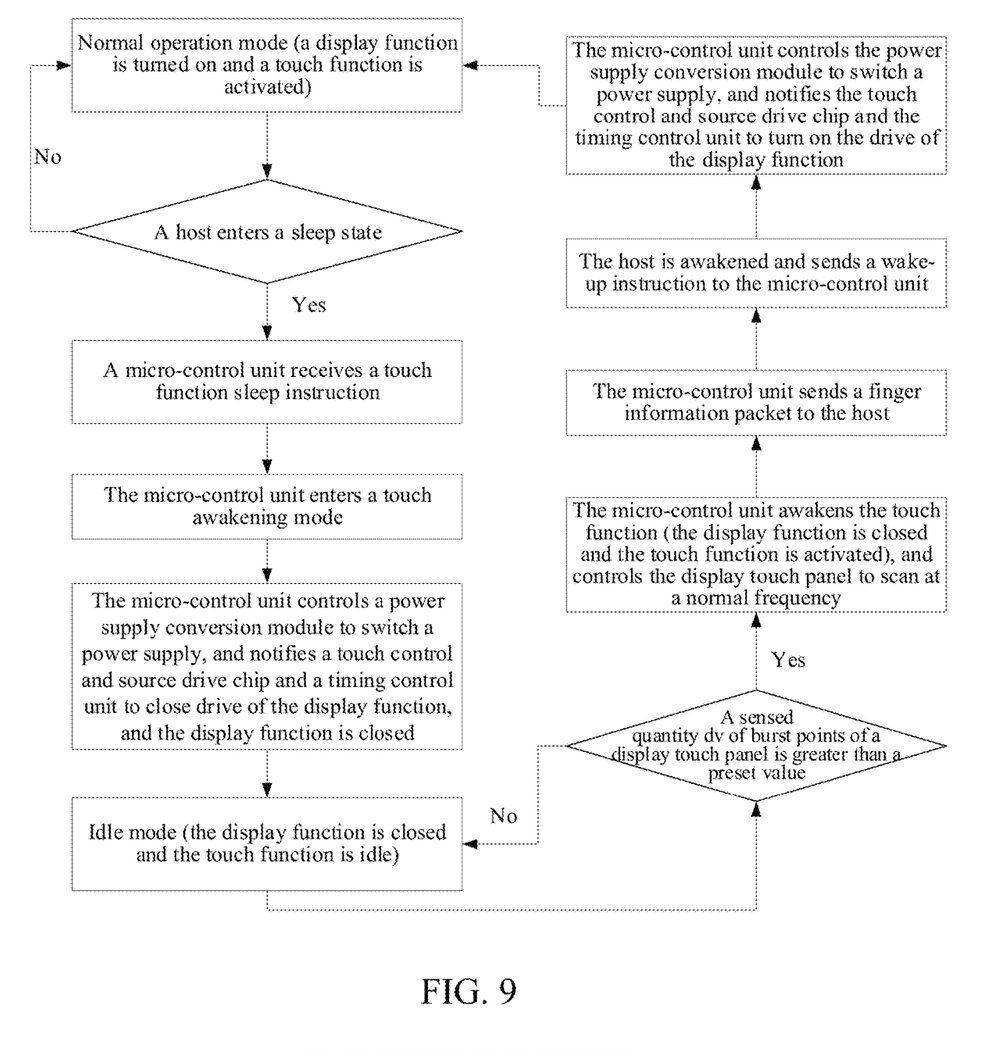
FIG. 9 shows a flow schematic diagram of a method for driving a display touch panel in another embodiment.

FIG. 9 shows a flow schematic diagram of a method for driving a display touch panel in another embodiment. As shown in FIG. 9, an achieving flow of the WOT function is as follows: when the host is in the normal operation mode, the display function of the display touch panel is turned on, and the touch function is activated. The micro-control unit sends a second enabling signal High to the power supply conversion module, the power supply conversion module selects the display power supply as the input power supply of the power supply management module, the circuit for driving the display touch panel and the display touch panel work normally.

After the host enters the sleep state, the micro-control unit receives a touch function sleep (i.e., TP Sleep) instruction sent by the host and enters the WOT mode. The host will control the display power supply to be powered off, and meanwhile the micro-control unit controls the power supply conversion module to select the touch power supply as the input power supply of the power supply management module. The micro-control unit notifies the timing control unit and the touch control and source drive chip to close drive of the display function, the display function of the display touch panel is closed, the host enters an idle mode (i.e., the display function is closed and the touch function is idle), and a scanning frequency of the display touch panel may be reduced from 120 Hz to 30 Hz.

In the idle mode, if the micro-control unit detects that a sensed quantity dv of burst points of the display touch panel is greater than a preset value, the touch function of the display touch panel will be completely awakened. At this time, the touch function is activated, the scanning frequency of the display touch panel may be switched back to 120 Hz for scanning, and the micro-control unit sends a finger information packet to the host to awaken the host. The host controls the display power supply to be re-powered, and sends a wake-up instruction to the micro-control unit. After receiving the wake-up instruction, the micro-control unit controls the power supply conversion module to select the display power supply as the input power supply of the power supply management module, the micro-control unit awakens the timing control unit and related drive of the display function in the touch control and source drive chip, and the host enters a normal operation mode. In the normal operation mode, the display function is opened, and the touch function is activated, so that the WOT function is achieved.

An apparatus embodiment of the present application will be described below, and may be configured to perform the method for driving the display touch panel in the above embodiments of the present application. For details not disclosed in the apparatus embodiment of the present application, please refer to the above embodiments of the method for driving the display touch panel of the present application.

Figure 10:
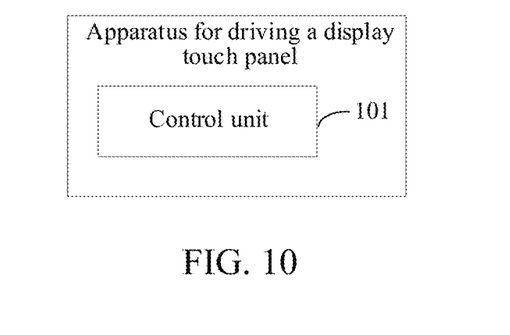
FIG. 10 shows a block diagram of an apparatus for driving a display touch panel in an embodiment.

Referring to FIG. 10, a block diagram of an apparatus for driving a display touch panel in an embodiment of the present application is shown. As shown in FIG. 10, the apparatus for driving the display touch panel according to the embodiment of the present application may include: a control unit 101, configured to send an enabling signal to a power supply conversion module, so that the power supply conversion module switches an input power supply of a power supply management module to a display power supply or a touch power supply according to the enabling signal.

In some embodiments of the present application, based on the aforementioned solution, the control unit 101 is also configured to send a first enabling signal to the power supply conversion module when a host is in a sleep state, so that the power supply conversion module switches the input power supply of the power supply management module from the display power supply to the touch power supply according to the first enabling signal, or send a second enabling signal to the power supply conversion module in a case that it is detected that the display touch panel is touched, so that the power supply conversion module switches the input power supply of the power supply management module from the touch power supply to the display power supply according to the second enabling signal.

In some embodiments of the present application, based on the aforementioned solution, the control unit 101 is also configured to send a display closing instruction to a touch control and source drive chip and a timing control unit, so that the touch control and source drive chip and the timing control unit control a display function of the display touch panel to close according to the display closing instruction.

In some embodiments of the present application, based on the aforementioned solution, the control unit 101 is also configured to send a first scanning frequency to the touch control and source drive chip, so that the touch control and source drive chip reduces a scanning frequency of the display touch panel according to the first scanning frequency.

Figure 11:
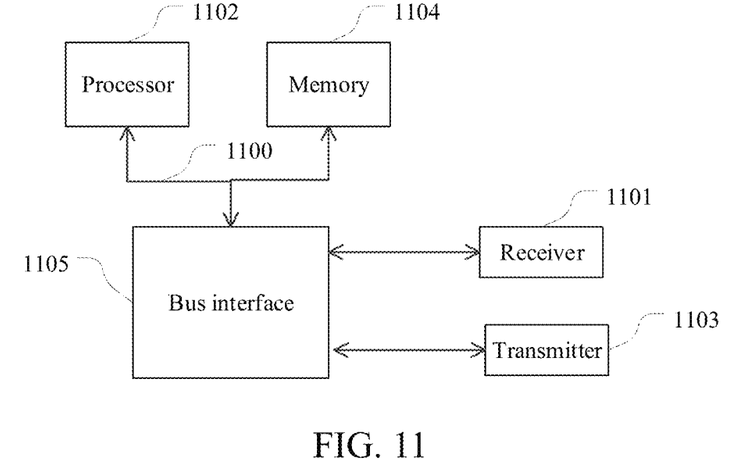
FIG. 11 shows a schematic diagram of a structure of a device for driving a display touch panel in an embodiment.

Based on a same inventive concept, an embodiment of the present application also provides a device for driving a display touch panel. Referring to FIG. 11, a schematic diagram of a structure of a device for driving a display touch panel in an embodiment of the present application is shown. The device for driving the display touch panel includes one or more memories 1104, one or more processors 1102, and at least one computer program (computer program instruction) stored on a memory 1104 and runnable on a processor 1102. When the processor 1102 executes the computer program, the method as before is implemented.

Among them, in FIG. 11, a bus architecture (represented by a bus 1100) is shown. The bus 1100 may include any quantity of interconnected buses and bridges, and the bus 1100 links together various circuits including one or more processors represented by the processor 1102 and a memory represented by the memory 1104. The bus 1100 may also link together various other circuits such as a peripheral device, a voltage regulator, and a power management circuit, etc., which are well known in the art and therefore will not be further described herein. A bus interface 1105 provides an interface between the bus 1100, and a receiver 1101 and a transmitter 1103. The receiver 1101 and the transmitter 1103 may be a same element, i.e., a transceiver, providing a unit configured to communicate with various other apparatuses over a transmission medium. The processor 1102 is responsible for managing the bus 1100 and general processing, while the memory 1104 may be configured to store data used by the processor 1102 when executing an operation.

Based on the same inventive concept, an embodiment of the present application provides a display touch device, including a display touch panel and a device for driving the above display touch panel, wherein the display touch panel is an in-cell capacitive touch control panel.

Based on the same inventive concept, an embodiment of the present application provides a computer-readable storage medium, having at least one computer program instruction stored therein, wherein the at least one computer program instruction is loaded and executed by a processor to implement operations performed by the method as before.

Functions described herein may be implemented in hardware, software executed by a processor, firmware, or any combination thereof. If implemented in the software executed by the processor, the functions may be stored on a computer-readable medium or transmitted via a computer-readable medium as one or more instructions or codes. Other examples and implementation solutions are within the scope and spirit of the present application and the appended claims. For example, due to a nature of the software, the functions described above may be implemented using software executed by a processor, hardware, firmware, hardwire, or a combination of any of these. In addition, various functional units may be integrated in one processing unit, or each unit may exist physically alone, or two or more units may be integrated in one unit.

In several embodiments provided by the present application, it should be understood that the disclosed technical contents may be implemented in other modes. Among them, the apparatus embodiment described above is only schematic. For example, division of units may be logical function division, and there may be other division modes in practical implementations, for example, multiple units or components may be combined or integrated into another system, or some features may be omitted or not performed. Another point is that, mutual coupling or direct coupling or a communication connection shown or discussed may be indirect coupling or a communication connection through some interfaces, units, or modules, and may be electrical, or in other forms.

Units described as separate parts may be or may not be physically separated. Component as control apparatuses may be or may not be physical units. That is, they may be located in one place, or may be distributed to multiple units. Part or all of the units thereof may be selected according to actual needs to achieve the purpose of the solution of the present embodiment.

Integrated units, if implemented in a form of software functional modules and when being sold or used as independent products, may be stored in a computer-readable storage medium. Based on such understanding, technical solutions of the present application in essence or the part making a contribution to the prior art or all or part of the technical solutions may be embodied in a form of a software product. The computer software product is stored in a storage medium, including several instructions for enabling a computer device (which may be a personal computer, a server, a network device, or the like) to perform all or part of acts of the method in each embodiment of the present application. And the aforementioned storage medium includes: various media capable of storing computer program instructions such as a U disk, a Read-Only Memory (ROM), a Random Access Memory (RAM), a mobile hard disk, a magnetic disk, or an optical disk.

The above are only embodiments of the present application and not intended to limit the present application. For those skilled in the art, the present application may have various modifications and variations. Any modification, equivalent substitution, improvement, etc. made within the spirit and principles of the present application shall be included in the scope of the claims of the present application.

The invention claimed is:

1. A circuit for driving a display touch panel, comprising: a power supply conversion module, a power supply management module, a display touch drive module, and a control module; a power supply input end of the power supply conversion module is configured to be connected with a display power supply and a touch power supply, an enabling end of the power supply conversion module is connected with an enabling end of the control module, and an output end of the power supply conversion module is connected with a power supply input end of the display touch drive module via the power supply management module; an output end of the display touch drive module is configured to be connected with the display touch panel, and the display touch panel is an in-cell capacitive touch control panel; and the touch power supply and the display power supply are respectively connected with a power supply input end of the control module; wherein
the control module is configured to send an enabling signal to the power supply conversion module; the power supply conversion module is configured to switch an input power supply of the power supply management module to the touch power supply or the display power supply according to the enabling signal; and the power supply management module is configured to supply power to the display touch drive module by using the touch power supply or the display power supply to enable the display touch drive module to drive the display touch panel to work.

2. The circuit for driving the display touch panel according to claim 1, wherein the enabling signal comprises a first enabling signal and a second enabling signal, and the control module is further configured to send the first enabling signal to the power supply conversion module when a host is in a sleep state, or send the second enabling signal to the power supply conversion module when it is detected that the display touch panel is touched; and the power supply conversion module is further configured to switch the input power supply of the power supply management module from the display power supply to the touch power supply according to the first enabling signal, or switch the input power supply of the power supply management module from the touch power supply to the display power supply according to the second enabling signal.

3. The circuit for driving the display touch panel according to claim 2, wherein a control end of the control module is connected with a controlled end of the display touch drive module, and the control module is further configured to send a display closing instruction to the display touch drive module, to enable the display touch drive module to control a display function of the display touch panel to close according to the display closing instruction.

4. The circuit for driving the display touch panel according to claim 3, wherein the display touch drive module comprises a touch control and source drive chip, wherein the touch control and source drive chip is connected with the control end of the control module, the power supply management module, and the display touch panel, respectively.

5. The circuit for driving the display touch panel according to claim 4, wherein the display touch drive module further comprises a timing control unit, the timing control unit is connected with the control end of the control module, the power supply management module, and the display touch panel, respectively.

6. The circuit for driving the display touch panel according to claim 5, wherein the control module comprises a micro-control unit and a first step-down unit, a first power supply input end of the micro-control unit is connected with the touch power supply via the first step-down unit, a second power supply input end of the micro-control unit is connected with the touch power supply, and a control end of the micro-control unit is respectively connected with the touch control and source drive chip and the timing control unit.

7. The circuit for driving the display touch panel according to claim 4, wherein the display touch drive module further comprises a timing control unit and a second step-down unit, the timing control unit is connected with the display power supply via the second step-down unit, and the timing control unit is further connected with the display touch panel.

8. The circuit for driving the display touch panel according to claim 7, wherein the control module comprises a micro-control unit and a first step-down unit, a first power supply input end of the micro-control unit is connected with the touch power supply via the first step-down unit, a second power supply input end of the micro-control unit is connected with the touch power supply, and a control end of the micro-control unit is connected with the touch control and source drive chip.

9. A method for driving a display touch panel, applied to a circuit for driving the display touch panel according to claim 1, wherein the method comprises:
sending an enabling signal to a power supply conversion module, to enable the power supply conversion module to switch an input power supply of a power supply management module to a display power supply or a touch power supply according to the enabling signal.

10. The method for driving the display touch panel according to claim 9, wherein the enabling signal comprises a first enabling signal and a second enabling signal, and the sending the enabling signal to the power supply conversion module, to enable the power supply conversion module to switch the input power supply of the power supply management module to the display power supply or the touch power supply according to the enabling signal, comprises:
sending the first enabling signal to the power supply conversion module when a host is in a sleep state, to enable the power supply conversion module to switch the input power supply of the power supply management module from the display power supply to the touch power supply according to the first enabling signal, or sending the second enabling signal to the power supply conversion module when it is detected that the display touch panel is touched, to enable the power supply conversion module to switch the input power supply of the power supply management module from the touch power supply to the display power supply according to the second enabling signal.

11. The method for driving the display touch panel according to claim 10, wherein after sending the first enabling signal to the power supply conversion module, the method further comprises:
sending a display closing instruction to the touch control and source drive chip and the timing control unit, to enable the touch control and source drive chip and the timing control unit to control a display function of the display touch panel to close according to the display closing instruction.

12. The method for driving the display touch panel according to claim 11, wherein after sending the display closing instruction to the touch control and source drive chip and the timing control unit, the method further comprises:
sending a first scanning frequency to the touch control and source drive chip, to enable the touch control and source drive chip to reduce a scanning frequency of the display touch panel according to the first scanning frequency.

13. An apparatus for driving a display touch panel, applied to a circuit for driving the display touch panel according to claim 1, wherein the apparatus comprises:
a control unit, configured to send an enabling signal to a power supply conversion module, to enable the power supply conversion module to switch an input power supply of a power supply management module to a display power supply or a touch power supply according to the enabling signal.

14. A device for driving a display touch panel, comprising a processor and a memory, wherein the memory stores computer program instructions capable of being executed by the processor, and instructions of the method according to claim 9 are implemented when the processor executes the computer program instructions.

15. A display touch device, comprising a display touch panel and a device for driving a display touch panel according to claim 14, wherein the display touch panel is an in-cell capacitive touch control panel.

16. A method for driving a display touch panel, applied to a circuit for driving the display touch panel according to claim 2, wherein the method comprises:
sending an enabling signal to a power supply conversion module, to enable the power supply conversion module to switch an input power supply of a power supply management module to a display power supply or a touch power supply according to the enabling signal.

17. A method for driving a display touch panel, applied to a circuit for driving the display touch panel according to claim 3, wherein the method comprises:
sending an enabling signal to a power supply conversion module, to enable the power supply conversion module to switch an input power supply of a power supply management module to a display power supply or a touch power supply according to the enabling signal.

18. An apparatus for driving a display touch panel, applied to a circuit for driving the display touch panel according to claim 2, wherein the apparatus comprises:
a control unit, configured to send an enabling signal to a power supply conversion module, to enable the power supply conversion module to switch an input power supply of a power supply management module to a display power supply or a touch power supply according to the enabling signal.

19. An apparatus for driving a display touch panel, applied to a circuit for driving the display touch panel according to claim 3, wherein the apparatus comprises:
a control unit, configured to send an enabling signal to a power supply conversion module, to enable the power supply conversion module to switch an input power supply of a power supply management module to a display power supply or a touch power supply according to the enabling signal.

20. A device for driving a display touch panel, comprising a processor and a memory, wherein the memory stores computer program instructions capable of being executed by the processor, and instructions of the method according to claim 10 are implemented when the processor executes the computer program instructions.

* * * * *